(12) United States Patent
Towler

(10) Patent No.: US 7,935,245 B2
(45) Date of Patent: May 3, 2011

(54) SYSTEM AND METHOD OF INCREASING SYNTHESIS GAS YIELD IN A FLUID CATALYTIC CRACKING UNIT

(75) Inventor: Gavin P. Towler, Inverness, IL (US)

(73) Assignees: UOP LLC, Des Plaines, IL (US); BP Corporation North America Inc., Warrenville, IL (US)

( * ) Notice: Subject to any disclaimer, the term of this patent is extended or adjusted under 35 U.S.C. 154(b) by 533 days.

(21) Appl. No.: 11/963,051

(22) Filed: Dec. 21, 2007

(65) Prior Publication Data
US 2009/0158662 A1    Jun. 25, 2009

(51) Int. Cl.
*C01B 3/26* (2006.01)
*B01J 38/40* (2006.01)
*C10G 11/00* (2006.01)

(52) U.S. Cl. .......................... 208/113; 252/373; 502/39
(58) Field of Classification Search .......... 518/700–715; 252/373; 502/39; 208/113
See application file for complete search history.

(56) References Cited

U.S. PATENT DOCUMENTS

| | | |
|---|---|---|
| 2,888,395 A | 3/1954 | Henny |
| 2,758,979 A | 8/1956 | Guthrie |
| 2,905,622 A | 9/1959 | McCarthy |
| 2,985,584 A | 5/1961 | Rabo et al. |
| 3,012,962 A | 12/1961 | Dygert |
| 3,137,133 A | 6/1964 | Wilson et al. |
| 3,363,993 A | 1/1968 | Campbell |
| 3,401,124 A | 9/1968 | Goulden |
| 3,554,903 A | 1/1971 | Wilson |
| 3,726,791 A | 4/1973 | Kimberlin et al. |
| 3,856,659 A | 12/1974 | Owen |
| 3,882,671 A | 5/1975 | Nebgen |
| 3,886,060 A | 5/1975 | Owen |
| 3,928,172 A | 12/1975 | Davis, Jr. et al. |
| 4,075,831 A | 2/1978 | McGann |
| 4,146,463 A | 3/1979 | Radford et al. |
| 4,158,680 A | 6/1979 | McGann |
| 4,272,402 A | 6/1981 | Mayes |
| 4,276,150 A | 6/1981 | McHenry, Jr. |
| 4,309,309 A | 1/1982 | Blanton, Jr. |
| 4,316,794 A | 2/1982 | Schoennagel |

(Continued)

FOREIGN PATENT DOCUMENTS

BE    875 477    10/1979

(Continued)

OTHER PUBLICATIONS

U.S. Appl. No. 11/643,497, filed Dec. 21, 2006, Towler et al.

(Continued)

*Primary Examiner* — Wayne Langel
(74) *Attorney, Agent, or Firm* — Brinks Hofer Gilson & Lione

(57) ABSTRACT

Systems and methods of reducing refinery carbon dioxide emissions by improving the overall synthesis gas yield in a fluid catalytic cracking unit having a reactor and a regenerator are discussed. In one example, a method comprises introducing spent catalyst and a feed gas comprising oxygen to the regenerator at gasification conditions. The method further comprises heating the spent catalyst to burn coke therefrom to produce a synthesis gas. The method further comprises combining the synthesis gas with a dry gas comprising hydrogen, creating the overall synthesis gas and thereby increasing the yield of the overall synthesis gas produced in the FCC unit.

9 Claims, 1 Drawing Sheet

U.S. PATENT DOCUMENTS

| | | | |
|---|---|---|---|
| 4,338,788 A | 7/1982 | Fink | |
| 4,388,218 A | 6/1983 | Rowe | |
| 4,392,345 A | 7/1983 | Geary, Jr. | |
| 4,399,651 A | 8/1983 | Geary, Jr. et al. | |
| 4,422,925 A | 12/1983 | Williams et al. | |
| 4,425,259 A | 1/1984 | Hettinger | |
| 4,431,529 A | 2/1984 | Carson | |
| 4,452,048 A | 6/1984 | Geary, Jr. et al. | |
| 4,539,303 A | 9/1985 | Maclean et al. | |
| 4,542,114 A | 9/1985 | Hegarty | |
| 4,600,499 A | 7/1986 | Hettinger | |
| 4,744,883 A * | 5/1988 | Hettinger, Jr. | 208/108 |
| 4,776,948 A | 10/1988 | Skraba | |
| 4,888,103 A | 12/1989 | Herbst et al. | |
| 4,904,372 A | 2/1990 | Goelzer | |
| 4,927,348 A | 5/1990 | Avidan | |
| 4,965,232 A | 10/1990 | Mauleon | |
| 5,098,554 A | 3/1992 | Krishna et al. | |
| 5,114,682 A | 5/1992 | Goelzer | |
| 5,202,294 A | 4/1993 | Raterman | |
| 5,451,313 A | 9/1995 | Wegerer et al. | |
| 5,538,623 A | 7/1996 | Johnson et al. | |
| 5,565,089 A | 10/1996 | Ramachandran et al. | |
| 5,597,537 A | 1/1997 | Wegerer et al. | |
| 5,800,697 A | 9/1998 | Lengemann | |
| 6,048,451 A | 4/2000 | Huff, Jr. et al. | |
| 6,110,356 A | 8/2000 | Hedrick et al. | |
| 6,149,859 A | 11/2000 | Jahnke et al. | |
| 6,324,895 B1 | 12/2001 | Chitnis et al. | |
| 6,369,286 B1 * | 4/2002 | O'Rear | 585/644 |
| 6,616,899 B1 | 9/2003 | Upson | |
| 6,866,771 B2 | 3/2005 | Lomas et al. | |
| 6,916,417 B2 * | 7/2005 | Mayes, Jr. | 208/113 |
| 7,005,455 B2 * | 2/2006 | Cnossen et al. | 518/700 |
| 7,622,033 B1 | 11/2009 | McGehee | |
| 7,699,974 B2 | 4/2010 | Hedrick | |
| 2002/0120017 A1 * | 8/2002 | Bohn et al. | 518/703 |
| 2004/0120878 A1 | 6/2004 | Mayes, Jr. | |
| 2005/0067322 A1 | 3/2005 | Xu | |
| 2006/0021909 A1 | 2/2006 | Cerqueira | |
| 2006/0116543 A1 | 6/2006 | Bellet et al. | |
| 2006/0266048 A1 | 11/2006 | Bell et al. | |
| 2007/0209367 A1 | 9/2007 | Bell et al. | |
| 2009/0032439 A1 | 2/2009 | Couch et al. | |
| 2009/0035191 A1 | 2/2009 | Couch et al. | |
| 2009/0035193 A1 | 2/2009 | Zhu et al. | |
| 2009/0158662 A1 | 6/2009 | Towler | |
| 2010/0137458 A1 * | 6/2010 | Erling | 518/702 |

FOREIGN PATENT DOCUMENTS

| | | |
|---|---|---|
| DE | 1 667 573 | 8/1967 |
| DE | 2021 787 | 11/1971 |
| DE | 36 35 269 A1 | 10/1985 |
| DE | 37 09 185 A1 | 3/1986 |
| EP | 0 083 462 | 7/1983 |
| EP | 0092065 | 10/1983 |
| EP | 0100531 | 2/1984 |
| EP | 0 113 380 A1 | 7/1984 |
| EP | 0162251 | 11/1985 |
| EP | 0 322 274 A1 | 6/1989 |
| EP | 0369537 | 5/1990 |
| EP | 0490453 | 6/1992 |
| EP | 0 629 685 A1 | 12/1994 |
| EP | 1 278 700 B1 | 1/2003 |
| EP | 1935966 | 6/2008 |
| EP | 1939269 | 7/2008 |
| EP | 2022838 | 2/2009 |
| FR | 2596059 | 9/1987 |
| FR | 2 796 932 | 2/2001 |
| GB | 711208 | 6/1954 |
| GB | 2 024 033 A | 1/1980 |
| GB | 2107205 | 4/1983 |
| GB | 2 197 390 A | 5/1988 |
| GB | 2 263 314 A | 7/1993 |
| JP | 59-52529 | 3/1984 |
| JP | 5-17162 | 2/1987 |
| JP | 62-32181 | 2/1987 |
| JP | 62-56919 | 3/1987 |
| JP | 5-320863 | 12/1993 |
| JP | 6-256239 | 9/1994 |
| WO | WO 85/04181 | 9/1985 |
| WO | WO 90/06352 | 6/1990 |
| WO | WO 96/39369 | 12/1996 |
| WO | WO 98/46700 | 10/1998 |
| WO | WO 99/11739 | 3/1999 |
| WO | WO 01/70909 A1 | 9/2001 |
| WO | WO 01/77010 A1 | 10/2001 |
| WO | WO 02/04347 A1 | 1/2002 |
| WO | WO 02/051966 A1 | 7/2002 |
| WO | WO 03/035591 A1 | 5/2003 |
| WO | WO 03/062142 A1 | 7/2003 |

OTHER PUBLICATIONS

U.S. Appl. No. 11/643,554, filed Dec. 21, 2006, Hedrick et al.
U.S. Appl. No. 11/643,733, filed Dec. 21, 2006, McGehee.
U.S. Appl. No. 11/643,734, filed Dec. 21, 2006, Towler et al.
U.S. Appl. No. 11/962,740, filed Dec. 21, 2007, Hedrick.
U.S. Appl. No. 11/962,763, filed Dec. 21, 2007, Hedrick.
U.S. Appl. No. 11/962,810, filed Dec. 21, 2007, Hedrick.
U.S. Appl. No. 11/963,006, filed Dec. 21. 2007, Towler.
U.S. Appl. No. 11/963,101, filed Dec. 21, 2007, Hedrick.
J. Terrible, et al.; "Consider using hydrogen plants to cogenerate power needs"; Hydrocarbon Processing (International edition); vol. 78/No. 12; pp. 43-53; Dec. 1999.
D.W. Townsend, et al.; "Heat and Power Networks in Process Design—Criteria for Placement of Heat Engines and Heat Pumps in Process Networks"; AIChe Journal (vol. 29, No. 5); pp. 742-748; Sep. 1983.
D.L. Bonk, et al.; "An Evaluation of Gas Turbines for APFBC Power Plants"; Presented to the Powergen 2000 Conference.
D.L. Bonk, et al.; "First-Generation Circulating Pressurized Fluidized Bed (CPFB) Combustor Power System with Industrial Components"; U.S. Department of Energy (date unknown).
D.G. Tajbl: "UOP Fluid Catalytic Cracking Process"; Handbook of Petroleum Refining Process, R.A. Meyers, Ed.; New York: McGraw Hill 1986.
McCabe, W.L. et al. (1993) Unit Operations in Chemical Engineering, $5^{th}$ ed., McGraw-Hill, (5 pages).
"Implications of Using 'Torch Oil'" accessed online at <http://www.catcracking.com/operations/Torch_Oil.shtm> on Sep. 30, 2009. (No additional bibliographic information available).

* cited by examiner

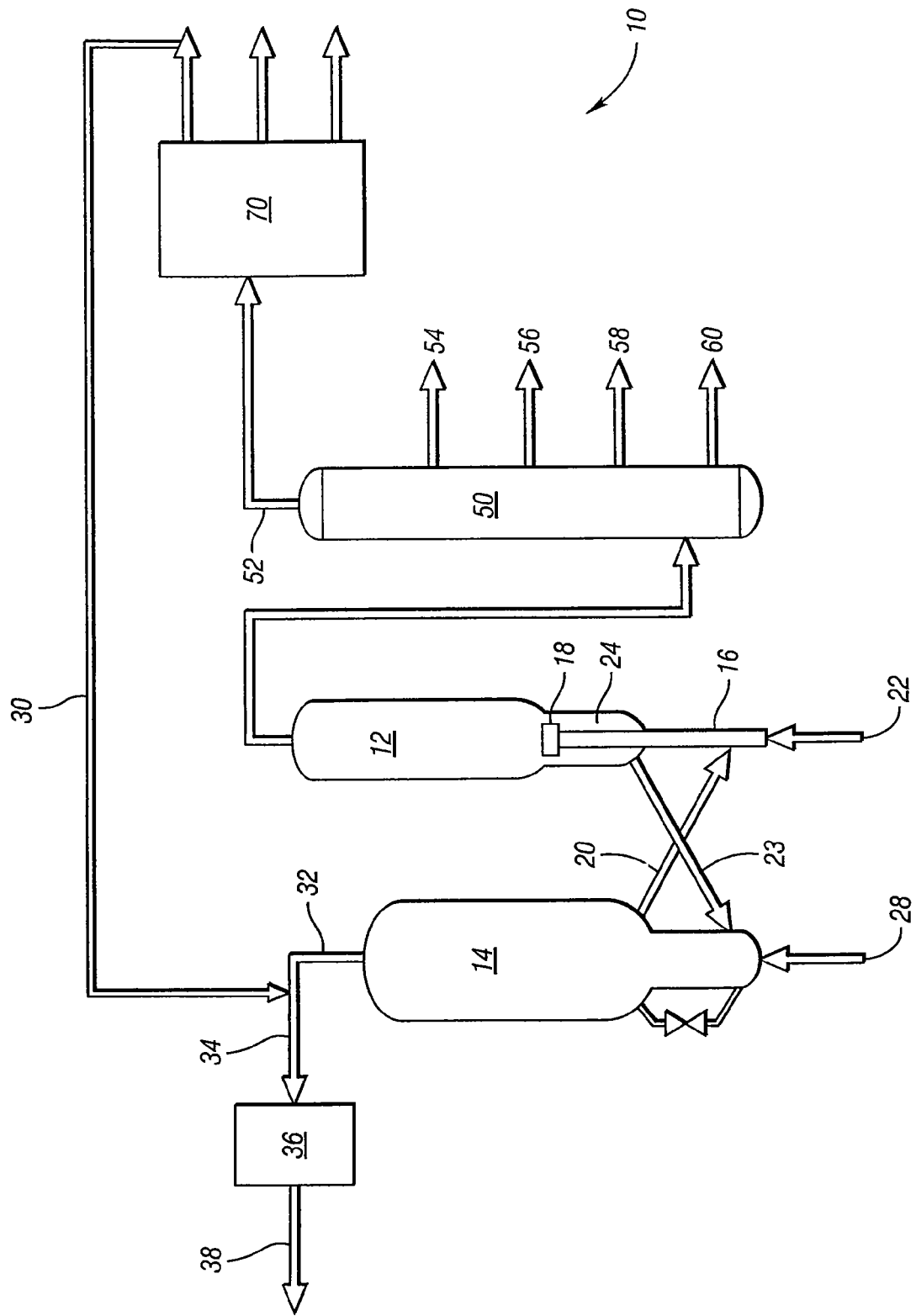

SYSTEM AND METHOD OF INCREASING SYNTHESIS GAS YIELD IN A FLUID CATALYTIC CRACKING UNIT

THE NAMES OF THE PARTIES TO A JOINT RESEARCH AGREEMENT

This application is the result of a joint research agreement between UOP LLC and BP Products North America Inc.

BACKGROUND OF THE INVENTION

The present invention relates to systems and methods of reducing carbon dioxide emissions in a fluid catalytic cracking (FCC) unit.

The fluidized catalytic cracking of hydrocarbons is the mainstay process for the production of gasoline and light hydrocarbon products from heavy hydrocarbon charge stocks such as vacuum gas oils or residual feeds. Large hydrocarbon molecules associated with the heavy hydrocarbon feed are cracked to break the large hydrocarbon chains thereby producing lighter hydrocarbons. These lighter hydrocarbons are recovered as product and can be used directly or further processed to raise the octane barrel yield relative to the heavy hydrocarbon feed.

The basic equipment or apparatus for the fluidized catalytic cracking of hydrocarbons has been in existence since the early 1940's. The basic components of the FCC process include a reactor, a regenerator, and a catalyst stripper. The reactor includes a contact zone where the hydrocarbon feed is contacted with a particulate catalyst and a separation zone where product vapors from the cracking reaction are separated from the catalyst. Further product separation takes place in a catalyst stripper that receives catalyst from the separation zone and removes trapped hydrocarbons from the catalyst by counter-current contact with steam or another stripping medium.

The FCC process is carried out by contacting the starting material—generally vacuum gas oil, reduced crude, or another source of relatively high boiling hydrocarbons—with a catalyst made up of a finely divided or particulate solid material. The catalyst is transported like a fluid by passing gas or vapor through it at sufficient velocity to produce a desired regime of fluid transport. Contact of the oil with the fluidized material catalyzes the cracking reaction. The cracking reaction deposits coke on the catalyst. Coke is comprised of hydrogen and carbon and can include other materials in trace quantities such as sulfur and metals that enter the process with the starting material. Coke interferes with the catalytic activity of the catalyst by blocking active sites on the catalyst surface where the cracking reactions take place.

Catalyst is traditionally transferred from the stripper to a regenerator for purposes of removing the coke by oxidation with an oxygen-containing gas. An inventory of catalyst having a reduced coke content relative to the catalyst in the stripper, hereinafter referred to as regenerated catalyst, is collected for return to the reaction zone. Oxidizing the coke from the catalyst surface releases a large amount of heat, a portion of which escapes the regenerator with gaseous products of coke oxidation generally referred to as flue gas or synthesis gas depending on the choice of feed gas to the regenerator (i.e., air to the regenerator generates flue gas while an artificially created gas comprising oxygen and (1) steam, (2) carbon dioxide or (3) steam and carbon dioxide will generate synthesis gas). The balance of the heat leaves the regenerator with the regenerated catalyst. The fluidized catalyst is continuously circulated from the reaction zone to the regeneration zone and then again to the reaction zone. The fluidized catalyst, as well as providing a catalytic function, acts as a vehicle for the transfer of heat from zone to zone. Catalyst exiting the reaction zone is spoken of as being spent, i.e., partially deactivated by the deposition of coke upon the catalyst. Specific details of the various contact zones, regeneration zones, and stripping zones along with arrangements for conveying the catalyst between the various zones are well known to those skilled in the art.

Refining companies are under increased pressure to reduce $CO_2$ emissions as a result of carbon tax legislation and other drivers such as a desire to demonstrate long-term sustainability. Roughly 15-25% of refinery $CO_2$ emissions are caused by the burning of catalyst coke in the FCC regenerator. Thus, there is a need to provide a way to reduce the carbon dioxide emissions in a refinery through operation of the fluid catalytic cracking (FCC) unit.

BRIEF SUMMARY OF THE INVENTION

Embodiments of the present invention generally provide systems and methods of reducing carbon dioxide emissions in a refinery through operation of a FCC unit having a reactor and a regenerator at gasification conditions. The systems and methods of the present invention provide solutions to lessen carbon dioxide emissions in a refinery through operation of a FCC unit.

In one example of the present invention, a method is provided for reducing carbon dioxide emissions by increasing the yield of an overall synthesis gas in a FCC unit having a reactor and a regenerator. The method comprises introducing spent catalyst and a feed gas comprising oxygen to the regenerator at gasification conditions. The method further comprises heating the spent catalyst to burn coke therefrom to produce a synthesis gas. The method further comprises combining the synthesis gas with a dry gas comprising hydrogen, creating the overall synthesis gas and thereby increasing the yield of the overall synthesis gas produced in the FCC unit.

In another example, an additional method is provided for reducing carbon dioxide emissions in a FCC unit with a reactor and a regenerator. The method comprises introducing spent catalyst and a feed gas comprising oxygen to the regenerator at gasification conditions. The method further comprises heating the spent catalyst to burn coke therefrom to produce a synthesis gas. The method further comprises combining the synthesis gas with a dry gas comprising hydrogen to produce an overall synthesis gas. The method further comprises conducting a secondary reforming reaction on the overall synthesis gas to increase the hydrogen content in the overall synthesis gas.

Additionally, another embodiment provides a system for reducing carbon dioxide emissions in a FCC unit while improving the yield of an overall synthesis gas. The system comprises a reactor for catalytic cracking of hydrocarbon feedstocks. The cracking reaction creates a spent catalyst and a dry gas product in the reactor effluent. The system further comprises a regenerator in fluid communication with the reactor. The regenerator uses a feed gas comprising oxygen to regenerate the spent catalyst under gasification conditions. Regeneration of the spent catalyst with the feed gas creates a synthesis gas. The system further comprises a secondary reforming unit which combines the synthesis gas from the regenerator and the dry gas from the reactor to produce an overall synthesis gas. The reaction in the secondary reforming unit improves the yield of the overall synthesis gas.

Further objects, features, and advantages of the present invention will become apparent from consideration of the following description and the appended claims when taken in connection with the accompanying drawings.

BRIEF DESCRIPTION OF THE DRAWINGS

FIG. 1 is a schematic diagram of a fluid catalytic cracking unit which combines a dry gas stream from the reactor effluent with a synthesis gas product stream from the regenerator.

DETAILED DESCRIPTION OF THE INVENTION

Embodiments of the present invention generally provide systems and methods of reducing carbon dioxide emissions in a fluid catalytic cracking (FCC) unit having a reactor and a regenerator at gasification conditions. In one embodiment, this is accomplished by combining a dry gas comprising hydrogen with a synthesis gas from the regenerator. The combined dry gas and synthesis gas are then sent to a secondary reforming unit. Through the reaction in the secondary reforming unit, the overall synthesis gas quality is enhanced. In particular, the overall synthesis gas has an improved hydrogen yield. By improving the hydrogen yield from the FCC unit, other refinery units no longer have to produce as much hydrogen gas, thereby lowering the overall amount of carbon dioxide emissions from the refinery.

FIG. 1 illustrates a fluid catalytic cracking (FCC) unit and separation system 10. As shown, the FCC unit 10 comprises a reactor 12 that is configured to receive a FCC feedstock 22 (fresh feed) and a regenerator 14 in fluid communication with the reactor 12 to receive spent catalyst. In this embodiment, the reactor 12 cracks the feedstock 22 therein to an effluent containing hydrocarbons ranging from methane through relatively high boiling point materials along with hydrogen and hydrogen sulfide. During the cracking reaction, a carbonaceous by-product is deposited on the circulating catalyst. This material, termed "coke," is continuously burned off the spent catalyst in the regenerator 14.

The FCC unit 10 comprises the regenerator 14 for regenerating spent catalyst from the reactor 12 under gasification conditions. In this embodiment, the regenerator 14 is configured to receive an artificially created feed gas and spent catalyst from the reactor 12. A preferred embodiment includes recycling carbon dioxide from a synthesis gas separation unit (not shown) plus oxygen from an oxygen generation unit (not shown). From the reactor 12, the spent catalyst has coke deposited thereon, reducing the activity of the catalyst. The regenerator 14 receives a feed gas 28 to burn the coke off the spent catalyst, thereby producing a synthesis gas 32 that exits a synthesis gas line to a synthesis-gas system.

Producing a high quality synthesis gas (i.e. high mol % of hydrogen and carbon monoxide) begins with the feed gas 28 comprising oxygen. The feed gas 28 preferably further comprises (1) steam, (2) carbon dioxide, or (3) steam and carbon dioxide. The feed gas 28 also preferably does not include nitrogen. In other words, the embodiment comprises a feed gas 28 that does not inject air into the regenerator. Instead, the injected gas is an artificially created mixture comprising (1) oxygen and steam, (2) oxygen and carbon dioxide or (3) oxygen, steam, and carbon dioxide. Concentration levels for these three main components preferably range from 0 to 50 mol % for oxygen (more preferably between 25 and 30 mol %), 0 to 75 mol % for carbon dioxide, and 0 to 75 mol % for steam. In one particular embodiment, the feed gas 28 is around 30 mol % oxygen and 70 mol % carbon dioxide on a dry basis. There may be some amount of water vapor present, depending on the source of the carbon dioxide. As previously mentioned, a preferred embodiment for the incoming feed gas includes a recycled stream of carbon dioxide from a synthesis gas separation unit (not shown) plus oxygen from an oxygen generation unit (not shown).

Additionally, using an artificially created feed gas to the regenerator 14 allows for additional advantages within the scope of this invention. For one embodiment, the oxygen concentration can be altered significantly. As mentioned, the oxygen content preferably ranges from 0 to 50 mol %, and more preferably ranges between 25 and 30 mol %. And just as the oxygen content can vary, so can the flowrate of spent catalyst or the flowrate of feed gas through the regenerator 14. Varying feed gas flow or spent catalyst mass flow can help control the temperature of the regenerated catalyst returning to the reactor for cracking.

The synthesis gas 32 produced from the reaction between feed gas 28 and spent catalyst coke may comprise carbon monoxide, hydrogen, carbon dioxide, steam, carbonyl sulfide, and hydrogen sulfide. The regenerator 14 is preferably configured to rejuvenate or reactivate the spent catalyst by burning the deposited coke off the spent catalyst with the feed gas at predetermined temperatures that is at a relatively high temperature (typically between 650-815° C. (1200-1500° F.)).

The regenerator 14 reactivates the catalyst so that, when returned to the reactor 12, the catalyst is in optimum condition to perform its cracking function. The regenerator 14 serves to gasify the coke from the catalyst particles and, at the same time, impart sensible heat to the circulating catalyst. The energy carried by the hot regenerated catalyst is preferably used to satisfy the thermal requirements for the reactor 12 of the FCC unit 10.

Referring to FIG. 1, from the regenerator 14, hot regenerated catalyst is preferably fed back to the reactor 12 via a reactivated catalyst return line 20. The regenerated catalyst vaporizes the hydrocarbon feedstock 22 to define resultant vapors. The resultant vapors carry the catalyst upward through a riser 16 of the reactor 12 with a minimum of back mixing. At the top of the riser 16, desired cracking reactions have been completed and the spent catalyst is relatively quickly separated from the hydrocarbon product to minimize secondary reactions. The catalyst-hydrocarbon mixture from the riser is discharged into the reactor vessel through a separation device 18, e.g., a riser termination device, achieving a substantial degree of initial catalyst-gas separation, e.g., at least 90 weight percent hydrocarbon product separation from catalyst.

The reactor effluent is preferably directed to a main fractionator or fractionation column 50 (discussed in greater detail below) of the unit 10 for resolution into gaseous light olefin co-products, FCC gasoline, and cycle stocks. The spent catalyst drops from within the reactor vessel into a stripper section 24 thereof, where a countercurrent flow of stripping gas removes trapped hydrocarbon, defining stripped spent catalyst. Stripped spent catalyst descends through a standpipe 23 and into the regenerator 14.

To maintain the activity of the working-catalyst inventory at a desired level and to make up for any catalyst lost from the system with the synthesis gas, fresh catalyst may be introduced into the circulating-catalyst system by any suitable manner. For example, this may be accomplished by way of a catalyst storage hopper (not shown). Moreover, an additional storage hopper (not shown) may be used to hold spent catalyst withdrawn from the circulating system as necessary to maintain the desired working activity and to hold all catalyst inventory when the FCC unit 10 is shut down for maintenance and repairs.

As shown in FIG. 1, in the operation of the FCC unit 10, fresh feedstock 22 and (depending on product-distribution objectives) recycled cycle oils are introduced into the bottom of the riser 16 together with a controlled amount of regenerated catalyst. The charge may be preheated, either by heat exchange or, for some applications, by means of a fired heater.

Feedstocks for the FCC process include mixtures of hydrocarbons of various types, including relatively small molecules such as found in gasoline to large molecules of 60 or more carbon atoms. The feedstock may include a relatively small content of contaminant materials such as organic sulfur, nitrogen compounds, and organometallic compounds. It is noted that the relative proportions of all such materials will vary with the geographic origin of the crude and the particular boiling range of the FCC feedstock. The feedstocks may be ranked in terms of their "crackabilities," or the ease with which they can be converted in an FCC unit. Crackability may be defined by a function of the relative proportions of paraffinic, naphthenic, and aromatic species in the feed.

The FCC unit 10 further includes a main-fractionation column 50 through which the reactor effluent is separated into various products. The main-fractionation comprises an overhead line 52, a first side cut line 54, a second side line 56, a third side cut line 58, and a bottom line 60. As shown, the overhead line 52 includes gasoline and lighter material. The overhead line 52 typically has an initial boiling point in the $C_5$ range and an end boiling point, or cut point, in the range of 150-205° C. (300-400° F.), preferably around 193° C. (380° F.). The first side cut line 54 includes naphtha, typically having a lower cut point between 120-193° C. (250-380° F.) and an upper cut point around 193-250° C. (380-480° F.), preferably around 215° C. (420° F.). The second side cut line 56 includes light cycle oil, typically having a boiling point range between 230° C. and 370° C. (450° F. and 700° F.). The third side cut line 58 includes heavy cycle oil, typically having a boiling point range between 260° C. and 370° C. (500° F. and 700° F.). Finally, the bottom line 60 includes slurry oil or clarified oil, typically with a boiling range that extends as high as the end point of the initial feed stock to the reactor (i.e. approximately 510-565° C. (950-1050° F.)). It is noted that the lines may include other products without falling beyond the scope or spirit of the present invention.

Reactor-product vapors are directed to the main fractionator 50 at which gasoline and gaseous olefin-rich co-products are taken overhead and routed to a gas-concentration unit 70. At the main-fractionator 50, light-cycle oil is recovered as a side cut with the net yield of this material being stripped for removal of light ends and sent to storage. Net column bottoms are yielded as slurry or clarified oil. Because of the high efficiency of the catalyst-hydrocarbon separation system utilized in the reactor design, catalyst carry-over to the main-fractionator 50 is minimized and it is not necessary to clarify the net heavy product yielded from the bottom of the main-fractionator 50 unless the material is to be used in some specific application requiring low solids content such as the production of carbon black. In some instances, heavy material can be recycled to the base of reactor riser 16 to be combined with fresh feed.

Maximum usage is made of the heat available at the main column 50. Typically, light-cycle and heavy-cycle oils are utilized in the gas-concentration unit 70 for heat-exchange purposes, and steam is generated by circulating the main-column bottoms stream.

In this embodiment, the FCC unit 10 further includes the gas-concentration unit 70 or an "unsaturated gas plant" in fluid communication with the overhead line 52 of the main-fractionation column 50. From the overhead line 52, the gas-concentration unit 70 receives unstable gasoline and lighter products that are separated therethrough into fuel gas for alkylation, polymerization, and debutanized gasoline.

The gas-concentration unit 70, or unsaturated-gas plant, may be one or an assembly of absorbers and fractionators that separate the main-column overhead into gasoline and other desired light products. Olefinic gases from other processes such as coking may be also sent to the FCC gas-concentration unit 70. The gas-concentration unit 70 may have one or a plurality of columns. For example, the gas-concentration unit may be a "four-column" gas-concentration plant comprising a primary absorber, a secondary absorber, a stripper, and a debutanizer. In this embodiment, gas from the FCC main-column overhead receiver is compressed and directed to the gas-concentration unit 70.

When the gas-concentration unit 70 separates the products, the light material is known as the "dry gas" product. Dry gas generally comprises at least one of hydrogen, methane, ethane and ethylene. A typical dry gas composition consists of 30 mol % hydrogen, 40 mol % methane, 15 mol % ethane and 15 mol % ethylene. These components are separated from useful light gas products like propylene (and heavier hydrocarbons) that were sent in the overhead line 52 to the gas-concentration unit 70. The yield of dry gas is typically in the range of 2-4 wt % of the FCC feedstock 22 to the reactor 12. Higher dry gas yields may be obtained in the FCC unit 10 by running the unit at a higher severity.

In typical FCC unit operations, the dry gas is sent to a refinery fuel system (not shown) to be burned in the process heaters. In one embodiment of this invention as shown in FIG. 1, the dry gas 30 is not sent to the refinery fuel system. Instead, the dry gas 30 is combined with the synthesis gas 32 from the regenerator 14. One goal of this combination is to enrich the quality of the overall synthesis gas 34. For example, by adding the dry gas 30 and its hydrogen content, the quality of the overall synthesis gas 34 is resultantly enhanced.

In an additional embodiment, the quality of the overall synthesis gas 34 can be further enhanced by sending the combined gas to a secondary reforming unit 36 to form an improved overall synthesis gas 38. Through a reforming reaction [e.g. $C_nH_{2n+2}+nH_2O \rightarrow nCO+(2n+1)H_2$], the methane and ethane present from the dry gas 30 are converted to carbon monoxide and hydrogen in the presence of steam. This reaction takes place at temperature ranges from 650-950° C. (1202-1742° F.) in the presence of catalysts such as nickel on alumina. Additionally, as the synthesis gas cools down, a water gas shift reaction ($CO+H_2O \leftrightarrows CO_2+H_2$) takes place, shifting the carbon monoxide and steam to carbon dioxide and hydrogen. This shift further improves the hydrogen yield in the improved overall synthesis gas 38. Operating conditions for the water gas shift reaction generally take place at temperatures ranging from 250-350° C. (482-662° F.) in the presence of a catalyst with zinc and copper oxide.

It should be noted that the secondary reforming produces an increased amount of carbon dioxide in addition to the increased amount of hydrogen. But from a larger perspective, the overall emissions for the refinery can be lowered through this process. In particular, the increased hydrogen production from the FCC unit 10 can reduce or eliminate the need for a hydrogen furnace, and all the fuel burned therein. With other refinery units no longer having to produce and burn these fuel sources, the carbon dioxide emissions from these units decline. Therefore, it is possible to produce more quality synthesis gas in the FCC unit 10 and reduce the amount of carbon dioxide emissions in the overall refinery. Additionally, the carbon dioxide being produced in the regenerator 14 or secondary reforming unit 36 is generally "clean" and capable of being sequestered by an amine absorber more readily than carbon dioxide emissions within other units in the refinery.

Additional alternative embodiments of this invention include hydrotreating the overall synthesis gas. Hydrotreatment may be recommended to remove undesired olefinic compounds or impurities like hydrogen sulfide. Hydrotreatment of the overall synthesis gas is possible with or without the secondary reforming unit 36.

An additional alternative embodiment within the scope of this invention includes enhancement of the overall synthesis gas 34 by combining the synthesis gas 32 with a light end or dry gas product stream taken from another unit within the refinery. While the dry gas 30 from the gas-concentration unit 70 is the preferred embodiment, alternative options are available. For one example, other hydrocracking units within the refinery produce similar light end or dry gas products that comprise at least one of hydrogen, methane, ethane and ethylene. Such a product stream could be re-routed to be combined with the synthesis gas 32 to improve the overall synthesis gas 34. Additionally, the combined gas could be sent to a secondary reforming unit 36 for further enhancement (as previously discussed).

The following examples of the invention are provided by way of explanation and illustration only. Mathematical simulations were conducted to calculate the improvement of the overall synthesis gas quality (i.e. increased hydrogen yield) when combining the synthesis gas from the regenerator with the dry gas from the reactor effluent. Three base case conditions are displayed in the following tables. The examples represent two variables (feed gas and coke level). Example 1 (3-IC) has with a feed gas with a 3:1 molar ratio of carbon dioxide to oxygen (dry gasification conditions) and 1.8 wt % coke on the spent catalyst entering the regenerator. Example 2 (3-HC) has a feed gas with a 3:1 molar ratio of carbon dioxide to oxygen (dry gasification conditions) and 3.0 wt % coke on the spent catalyst entering the regenerator. In these two examples, the combined gas is sent to a secondary reforming unit, where it undergoes a reforming reaction to produce additional hydrogen gas. The reformed product subsequently undergoes a low temperature water gas shift reaction at 260° C. (500° F.). Example 3 (4-HC) has a feed gas with a 3:1 molar ratio of steam to oxygen (steam gasification conditions) and 3.0 wt % coke on the spent catalyst entering the regenerator. There is no water gas shift reaction at 260° C. (500° F.) in this example.

Table 1 (below) displays the improved hydrogen yield in an overall synthesis gas when the synthesis gas from the regenerator is combined and reacted with the dry gas in a secondary reforming unit under the conditions of Example 1. The incoming feed gas to the regenerator contains a 3:1 molar ratio of carbon dioxide to oxygen. Additionally, the spent catalyst entering the regenerator comprised 1.8 wt % coke. The flowrate of the overall synthesis gas (i.e. referring to carbon monoxide plus hydrogen) increases 68%, and the flowrate of hydrogen increases by 65%.

TABLE 1

3:1 CO2 to O2, 1.8 wt % coke

| | BASE CASE (3-IC) | THIS INVENTION |
|---|---|---|
| Flowrate, lb/hr | 1157878.47 | 1221013.34 |
| Flowrate, lbmol/hr | 37443.87 | 44307.01 |
| Gas molar flow (lbmol/hr) | | |
| CO | 720.03 | 1479.40 |
| CO2 | 23817.60 | 24763.60 |

TABLE 1-continued

3:1 CO2 to O2, 1.8 wt % coke

| | BASE CASE (3-IC) | THIS INVENTION |
|---|---|---|
| H2 | 8957.61 | 14765.60 |
| H2O | 3916.70 | 3264.40 |
| H2S | 33.89 | 34.00 |
| COS | 8.11 | 0.00 |
| SO2 | 0.000012 | 0.000000 |
| S2 | 0.00 | 0.00 |
| O2 | 0.00 | 0.00 |
| N2 | 0.00 | 0.00 |
| NH3 | 0.00 | 0.00 |
| Added steam | 2000.00 | |
| Increase in synthesis gas (CO + H2) | | 1.6786 |
| Increase in hydrogen | | 1.6484 |

Table 2 (below) displays the improved hydrogen yield in an overall synthesis gas when the synthesis gas from the regenerator is combined and reacted with the dry gas in a secondary reforming unit under the conditions of Example 2. The incoming feed gas to the regenerator contains a 3:1 molar ratio of carbon dioxide to oxygen. Additionally, the spent catalyst entering the regenerator comprised 3.0 wt % coke. The flowrate of the overall synthesis gas (i.e. referring to carbon monoxide plus hydrogen) increased by 31%, and the flowrate of hydrogen increased by 35%.

TABLE 2

3:1 CO2 to O2, 3.0 wt % coke

| | BASE CASE (3-HC) | THIS INVENTION |
|---|---|---|
| Flowrate, lb/hr | 1746188.63 | 1863527.80 |
| Flowrate, lbmol/hr | 60707.64 | 70572.01 |
| Gas molar flow (lbmol/hr) | | |
| CO | 2205.15 | 2224.40 |
| CO2 | 35740.32 | 37426.61 |
| H2 | 18701.81 | 25248.61 |
| H2O | 4003.69 | 5610.39 |
| H2S | 62.74 | 62.00 |
| COS | 14.14 | 0.00 |
| SO2 | 0.000005 | 0.000000 |
| S2 | 0.00 | 0.00 |
| O2 | 0.00 | 0.00 |
| N2 | 0.00 | 0.00 |
| NH3 | 0.00 | 0.00 |
| Added steam | 5000.00 | |
| Increase in synthesis gas (CO + H2) | | 1.3141 |
| Increase in hydrogen | | 1.3501 |

Table 3 (below) displays the improved hydrogen yield in an overall synthesis gas when the synthesis gas from the regenerator is combined with the dry gas under the conditions of Example 3. The incoming feed gas to the regenerator contains a 3:1 molar ratio of steam to oxygen. Additionally, the spent catalyst entering the regenerator comprised 3.0 wt % coke. In this example, the overall synthesis gas does not undergo a water gas shift reaction at 260° C. (500° F.). The flowrate of the overall synthesis gas (i.e. referring to carbon monoxide plus hydrogen) increased by 35%, and the flowrate of hydrogen increased by 48%.

TABLE 3

| | 3:1 steam to O2, 3.0 wt % coke | |
|---|---|---|
| | BASE CASE (4-HC) | THIS INVENTION |
| Flowrate, lb/hr | 934189.89 | 934189.89 |
| Flowrate, lbmol/hr | 46945.78 | 46945.78 |
| Gas molar flow (lbmol/hr) | | |
| CO | 1950.12 | 369.16 |
| CO2 | 13122.41 | 16408.88 |
| H2 | 17028.61 | 25175.85 |
| H2O | 14787.96 | 14794.19 |
| H2S | 55.40 | 55.00 |
| COS | 1.27 | 0.00 |
| SO2 | 0.000161 | 0.000000 |
| S2 | 0.00 | 0.00 |
| O2 | 0.00 | 0.00 |
| N2 | 0.00 | 0.00 |
| NH3 | 0.00 | 0.00 |
| Added steam | 0.00 | |
| Increase in synthesis gas (CO + H2) | | 1.3460 |
| Increase in hydrogen | | 1.4784 |

While the present invention has been described in terms of preferred embodiments, it will be understood, of course, that the invention is not limited thereto since modifications may be made to those skilled in the art, particularly in light of the foregoing teachings.

What is claimed is:

1. A method of increasing the yield of an overall synthesis gas in a fluid catalytic cracking unit having a reactor and a regenerator, the method comprising:

introducing spent catalyst and a feed gas comprising oxygen to the regenerator at gasification conditions;

heating the spent catalyst to burn coke therefrom to produce a synthesis gas from the regenerator;

separating dry gas comprising hydrogen from another refinery unit or reactor product vapors in a gas condensing section of the fluid catalytic cracking unit;

combining the synthesis gas with the dry gas, thereby increasing the yield of the overall synthesis gas produced in the fluid catalytic cracking unit; and reforming the overall synthesis gas in a secondary reforming unit, thereby increasing the hydrogen content in the overall synthesis gas.

2. A method of claim 1 wherein the feed gas further comprises steam.

3. A method of claim 2 wherein the feed gas has a mole ratio of about 3 moles of steam per mole of oxygen.

4. A method of claim 1 wherein the feed gas further comprises carbon dioxide.

5. A method of claim 4 wherein the feed gas has a mole ratio of about 3 moles of carbon dioxide per mole of oxygen.

6. A method of claim 1 wherein the dry gas further comprises at least one member selected from the group consisting of methane, ethane, and ethylene.

7. A method of claim 1 wherein the synthesis gas from the regenerator comprises at least one member selected from the group consisting of hydrogen, carbon monoxide, carbon dioxide and steam.

8. A method of claim 1 further comprising:

hydrotreating the overall synthesis gas to reduce the amount of olefinic compounds in the overall synthesis gas.

9. A method of claim 1 further comprising:

hydrotreating the overall synthesis gas to remove hydrogen sulfide present in the overall synthesis gas.

* * * * *